United States Patent

[11] 3,602,233

| [72] | Inventors | Joseph J. Hammel<br>Pittsburgh, Pa.;<br>John D. Mackenzie, Schenectady, N.Y. |
|---|---|---|
| [21] | Appl. No. | 822,213 |
| [22] | Filed | May 6, 1969 |
| [45] | Patented | Aug. 31, 1971 |
| [73] | Assignee | P P G Industries, Inc.<br>Pittsburgh, Pa.<br>Continuation-in-part of application Ser. No.<br>736,670, June 13, 1968, now abandoned. |

[54] SMOKING DEVICE INCORPORATING MICROPOROUS GLASS PARTICLE FILTER
4 Claims, 6 Drawing Figs.

[52] U.S. Cl. ................................................. 131/10.7, 131/207, 131/266
[51] Int. Cl. ................................................. A24b 15/02, A24f 13/06
[50] Field of Search ................................................. 131/261, 265, 264, 205, 207, 261–269, 10–10.9; 210/496; 55/522, 527

[56] References Cited
UNITED STATES PATENTS

| 2,106,744 | 2/1938 | Hood et al. ................. | 161/160 |
| 2,307,088 | 1/1943 | Whiteley ..................... | 131/17 R UX |
| 2,327,991 | 8/1943 | Betts ........................... | 131/264 UX |
| 2,765,515 | 10/1956 | Knudson ...................... | 131/10.9 X |
| 2,999,775 | 9/1961 | Marks .......................... | 131/17 |
| 3,251,365 | 5/1966 | Kieth et al. .................. | 131/10.7 |
| 3,412,737 | 11/1968 | Pinter .......................... | 131/261 |
| 3,498,299 | 3/1970 | White .......................... | 131/265 |

FOREIGN PATENTS

| 566,810 | 12/1932 | Germany ...................... | 131/205 |

Primary Examiner—Melvin D. Rein
Attorney—Chisholm and Spencer

ABSTRACT: A tobacco smoke filter medium of microporous glass. A suitable microporous glass is an acid-leached, phase-separated, borosilicate glass, especially alkali borate silicate glass. The porous glass is used in bulk, granular, or fibrous form. The porous glass may be treated in an atmosphere of water vapor to increase the concentration of hydroxyl groups on the surfaces of the pores. The microporous glass filtering material is disposed in a downstream end of the smoke conduit of a smoking device which is adapted to accommodate a charge of tobacco. The glass particles present a microporous skeletal structure in which the $SiO_2$ content is at least about 90 percent by weight.

SMOKING DEVICE INCORPORATING MICROPOROUS GLASS PARTICLE FILTER

This application is a continuation-in-part of application Ser. No. 736,670, filed June 13, 1968, now abandoned.

BACKGROUND OF THE INVENTION

This invention relates to a tobacco smoke filter. As is well known, unfiltered tobacco smoke carries with it nicotine, various tarlike pyrogenic substances, and toxic gases. In smoking tobacco, whether as a cigarette, cigar, or pipe, if not removed these harmful ingredients are absorbed by mucosa of the smoker and, when inhaled, they travel further into the lungs where they exert a highly irritating action.

Cigarette manufacturers are ever endeavoring to find a means which will remove these irritating substances as much as possible from tobacco smoke. Filtering and/or absorbent means built into the cigarette, cigarette holder, or pipe have been extensively manufactured and sold with claims that a high percentage of the tarlike pyrogenic substances and toxic gases harmful to the human being are removed from the smoke before entering the mouth of the smoker.

The filters and/or absorbents are usually in the form of a case-capsule, shell, or the like, which has in it the filter and/or absorbent materials. They are sometimes called cartridges. The cartridges are used in pipes and cigarette holders until renewal is necessary. Then the old cartridge is replaced by a new one. With cigarettes, the cartridge or container is built in the mouth end of the cigarette and is thrown away when the cigarette has been smoked. Thus, those used as a part of the cigarette are sometimes called "throwaway filters."

Many substances have been, and continue to be, employed or are known, which serve as filters and/or absorbents in cigarettes, pipes, or cigarette holders. Raw cotton, ground cork, carbonized tobacco, wool, asbestos, ion exchange resins, and charcoal are examples. Other known filters and/or absorbents for the tarlike and other impurities carried by tobacco smoke are small pellets of silica gel and clays. Also, cigarettes per se are used in pipes as the filtering and/or absorbent material for the tobacco smoke.

It is desired in a tobacco smoke filter that the harmful ingredients be removed without removing the taste of the tobacco smoke. It is also desired that the filter not be so efficient as to quickly clog up and prevent passage of the smoke altogether. It is important that a comfortable level of draw be maintained throughout the smoke. The filter material must be of such material that the harmful ingredients that are filtered out initially are not subsequently released upon the passage of further smoke through the filter. In addition to all these considerations, it is most desirable that the filter be inexpensive.

INVENTION

The present invention accomplishes the above-desired functions of a tobacco smoke filter by use of microporous glass having interconnecting pores as the essential filtering ingredient. "Metal" borosilicate glasses are readily processed to form a useful microporous structure of interconnecting pores comprising a silicate skeletal structure having a low borate content. Suitable microporous glass can be produced according to the teachings of U.S. Pat. No. 2,106,744 wherein it is disclosed that an alkali borosilicate glass is heat treated to develop two separate glassy phases, one of which can be leached out by acid treating thereby leaving a highly porous glass structure. This method of leaching glass is well known in the art and, other than setting forth a specific example of the leaching method to illustrate a preferred mode of carrying out the invention, the description of the invention will not dwell on the leaching technology.

Glasses useful in this invention are glasses which may be phase separated to produce an article having a continuous, leachable, minor phase such as the borate phase in a phase-separated borosilicate glass. It is significant in this invention that the base glass be phase separable and leachable to produce a microporous structure having interconnecting pores. Microporous structures of this kind are most easily obtained from glasses having a major phase substantially of silica inasmuch as silica is substantially more acid resistant than other glassy phases as borates, phosphates, and the like. A major phase substantially of alumina is also useful, but base glasses having a high alumina content are difficult to melt and frequently have a tendency to crystallize rather than separate into two glassy phases.

The microporous glasses of this invention are skeletal glassy structures preferably high in silica, e.g., greater than about 90 percent by weight of $SiO_2$. Base glasses amenable to phase separation and leaching to form such microporous structures include metal borosilicates, especially alkali metal borosilicates, alkaline earth borosilicates, and metal borosilicates such as lead borosilicate, zinc borosilicate, titanium borosilicate, and the like. In the borosilica glasses, the weight ratio of $SiO_2$ to $B_2O_3$ will be significantly greater than 1:1 so that upon phase separation the major phase will be the silicate phase which will contain only minor quantities of metal, e.g., $Na_2O$, $BaO$, $PbO$, and the like, and other glass formers such as $B_2O_3$, $Al_2O_3$, $P_2O_5$, and the like. Especially useful are alkali metal borosilicate glasses containing less than about 15 percent by weight of alkali metal, less than about 50 percent by weight of boron oxide, and greater than about 60 percent by weight of silica. A preferable compositional range is about 5 to 10 percent of weight of alkali metal, about 15 to 30 percent by weight of $B_2O_3$, and about 70 to 85 percent by weight of $SiO2$. Small quantities of other glass formers, fluxes, and other oxides, halides, nitrides, and the like may be included in the base glass composition so long as the quantities of such ingredients do not alter the phase separation and leaching characteristics of the glass.

The original composition of the glass is important only to the extent that it can be phase separated and leached to a microporous structure having interconnecting pores. While the metal borosilicate glasses are preferred because of their facility of readily phase separating and ease of leaching, other glasses such as soda-lime-silica, germanate, and commercial fiber glass compositions are useful to the extent that they can be phase separated into two glassy phases—a minor phase readily leached by acids and a major phase substantially insoluble in acids other than hydrofluoric acid or at least substantially insoluble in those acids which readily dissolve the minor glassy phase. Also, the minor phase should be substantially continuous so that the resulting porous glass structure contains pores which are interconnecting.

Phase-separable glasses useful in this invention may be phase separated by heating at elevated temperatures below the miscibility temperature although some glasses, such as the lithia borosilicate glasses, tend to phase separate upon cooling from melting temperatures. A preferred manner of phase separating glasses such as metal borosilicates, especially alkali metal silicates, is by heating said glasses to about 450° C. to about 700° C. or higher but below the miscibility temperature of the glass for a sufficient period of time to form a major silica-rich phase and a minor, substantially continuous borate-rich phase.

Leaching of phase-separated glasses described above may be accomplished in acids such as hydrochloric, sulfuric, nitric, and the like, which dissolve the acid-soluble minor phase, e.g., borate-rich phase, to leave a skeletal glass structure of interconnecting micropores. The leaching is preferably accomplished at temperatures above room temperature and through use of concentrated acids. Leaching proceeds rapidly at temperatures between about 70° C. and 200° C. Concentration of the acid should be at least 1N and, preferably, about 3N.

The leached glasses useful in this invention have an approximate pore volume of about 5 to 70 percent, preferably about 10 to 50 percent. The pores are interconnecting and the average size of the pore openings ranges from about 5 to 10,000 angstroms in diameter, with pore openings of about 10 to 1,000 angstroms readily obtained in variations in techniques of phase separation and leaching. Microporous glass having pore openings of about 40 to 1,000 angstroms has proved to be especially effective in removing noxious gases and particulate matter from tobacco smoke.

The porous glass of this invention has a nitrogen surface area on the order of about 50 to 500 square meters per gram. Porous glass of surface areas about 50 to 200 square meters per gram are readily obtainable in a very economical manner and provide efficient tobacco smoke filters. A relatively high concentration of hydroxyl groups exists on the surface of the pores and these hydroxyl groups readily form hydrogen bonds with molecules coming in contact with the surface. The number of hydroxyl groups present can be increased by treatment with water vapor.

After phase separation and leaching, the skeletal glass structure is substantially $SiO_2$ with a minor quantity of other glass formers and flux present. Microporous glasses derived from metal borosilicates, for example, alkali borosilicates, contain greater than 90 percent by weight $SiO_2$, less than about 8 percent by weight $B_2O_3$, and less than 2 percent by weight alkali metal oxide.

In a preferred mode of the invention, the phase-separated glass is crushed, sieved, and leached so that it can be used in granular form. In order to prevent a large pressure drop (difficult or uncomfortable draw), the particle size is in the range of 1 to 1,000 microns, preferably 100 to 500 microns. Alternatively, the glass can be leached first and then crushed to the desired particle size.

The microporous glass can also be used in bulk and in fibrous form. Microporous glass granules or fibers can be combined with the tobacco fibers and/or they can be incorporated in a filter-tip cartridge at one end of the cigarette or cigar. When combined with the tobacco, the microporous glass can comprise 1 to 50 percent, preferably 5 to 20 percent, by weight of the microporous glass and tobacco. Glass fibers can serve the additional function of holding the tobacco ash together since they are incombustible. The strength of the fine glass fibers, 0.5 to 20 microns in diameter, is not sufficient, however, to prevent the ash from being dislodged upon being tapped in the normal smoker's manner. The length of the fibers can vary from ⅛ to 3 inches, depending upon the desire of having the fibers hold the ash together. The longer the fiber, the better such purpose is served.

The microporous glass is also used in cartridge form in a cigarette or cigar holder and in a pipe filter.

The microporous glass fibers can also be used in bulk or paper form to serve as a filter. For example, a combination of cellulose fibers and glass fibers readily form a paper which can be used as a filter medium. Very fine glass fibers, on the order of 0.5 to 5 microns, are readily formed into a glass paper. The porous glass can also be used in combination with one or more other filter materials such as charcoal and those mentioned above.

Fibers of microporous glass having interconnecting pores have been found to be an especially effective multipurpose tobacco filter. Fibers of microporous glass can be formed in a tow and utilized in a manner similar to commercial cellulose acetate fibers. In cigarettes, a filter comprised solely of fiber glass can be readily formed by current filter-forming equipment. The fibers are thus more easily fabricated than granular materials such as granular microporous glass or charcoal which require a complete enclosure to contain these materials.

Fibers of microporous glass useful in this invention generally have a diameter of about 0.5 to about 20 microns or more. Diameters greater than 20 microns effectively filter gases and particulate matter from tobacco smoke but are more difficult to fiberize. A 20 millimeter length of a microporous fiber glass filter attached to a commercial brand cigarette was found to be about 50 percent more effective than a commercial cellulose acetate filter of comparable draw in removing particulate matter and gases.

Fibers of microporous glass may be readily obtained by melting and drawing phase-separable glass compositions according to conventional fiber glass techniques. After fibers of microporous glass are drawn, they are phase separated and leached according to the techniques described hereinabove. Sizing of the glass fibers to desired lengths may be accomplished at any time after drawing.

The microporous glass filter activity is improved by increasing the concentration of hydroxyl groups on the surfaces of the pores. This is accomplished by heating the microporous glass, in bulk, granular, or fibrous form, at an elevated temperature, i.e., on the order of 100° to 600° C., preferably about 450° to 550° C. in an atmosphere consisting essentially of $H_2O$ and $N_2$ gases. A suitable atmosphere contains 10 to 90 percent by volume of $H_2O$ vapor and 10 to 90 percent $N_2$ gas. This treatment is continued for a period of about 5 to 120 minutes with a longer time being required for a lower treatment temperature.

The activity of the porous glass surfaces can be altered by incorporating transition metal ions into or on the surface of the glass. This can be done by ion exchange at elevated temperatures or immersion in a metal ion solution at low temperatures and subsequently heating the coated surfaces at elevated temperatures, i.e., 100° to 600° C. preferably 450° to 550° C.

The invention and its uses are described in further detail in the examples and in conjunction with the drawing in which.

Figure 1:
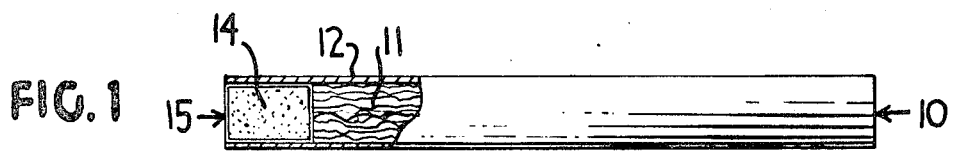
FIG. 1 is a view, partly in section, of a cigarette illustrating the use of the filter medium.

In FIG. 1 of the drawing there is shown a cigarette 10 containing tobacco 11 enclosed in cigarette paper 12. Granules 14 of a leached alkali borosilicate glass are enclosed in a container 15 at the smoker's end of the cigarette 10. The granules 14 are prepared and treated as described hereinafter in the examples. The container 15 can be made of paper or plastic according to conventional cigarette manufacturing techniques. Substitution of microporous glass fibers for granules in this article would result in a similar construction but without requiring a container for the filter media, i.e., a structure substantially identical to a commercial cellulose acetate filter cigarette would result.

Figure 2:
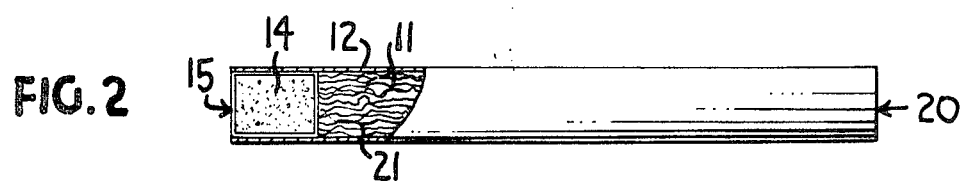
FIG. 2 is a view, partly in section, of a cigarette illustrating another embodiment of the invention.

In FIG. 2 of the drawing there is shown a cigarette 20 constructed of cigarette paper 12 containing tobacco 11 having intermingled therewith leached porous alkali borosilicate glass fibers 21. Filter granules 14 are enclosed in container 15 and are inserted at the smoker's end of the cigarette 20 as in FIG. 1.

Figure 3:
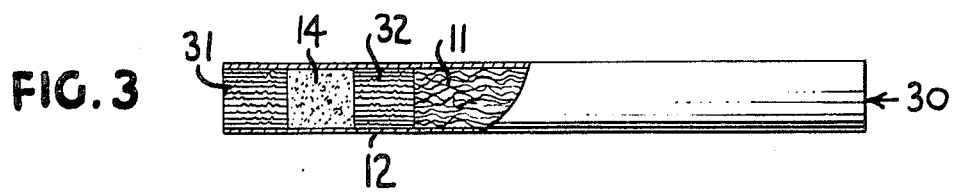
FIG. 3 is a view, partly in section, of a cigarette illustrating a further embodiment of the invention.

In FIG. 3 of the drawing there is shown a cigarette 30 similar to cigarette 10 but with a different filter medium enclosed in container 15. The filter medium is composed of three sections. The section next to the tobacco 11 is made of paper 32 composed of leached alkali borosilicate fibers and cellulose fibers. The intermediate section is composed of granules 14. The section next to the smoker is composed of conventional cellulose paper 31 used commercially in cigarettes such as the Tareyton or Lark filter cigarette.

Figure 4:
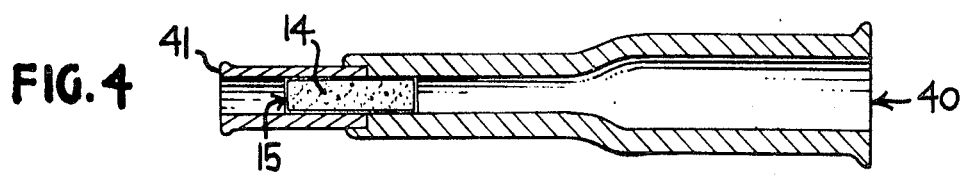
FIG. 4 is a view, partly in section, illustrating the use of the invention in a cigarette holder.

In FIG. 4 there is shown a cigarette holder 40 containing in the removable mouthpiece 41 a filter medium composed of granules 14 enclosed in container 15.

Figure 5:
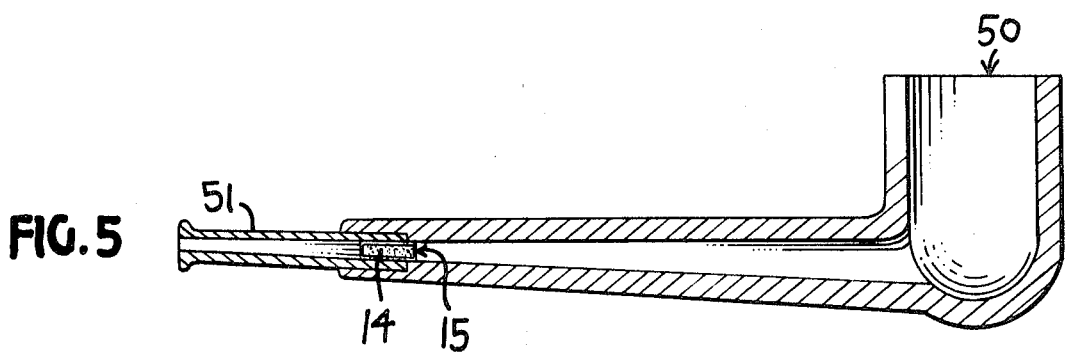
FIG. 5 is a view, partly in section, illustrating the use of the invention in a pipe.

In FIG. 5 there is shown a pipe 50 having in the removable mouthpiece 51 a filter medium composed of granules 14 enclosed in container 15.

Figure 6:
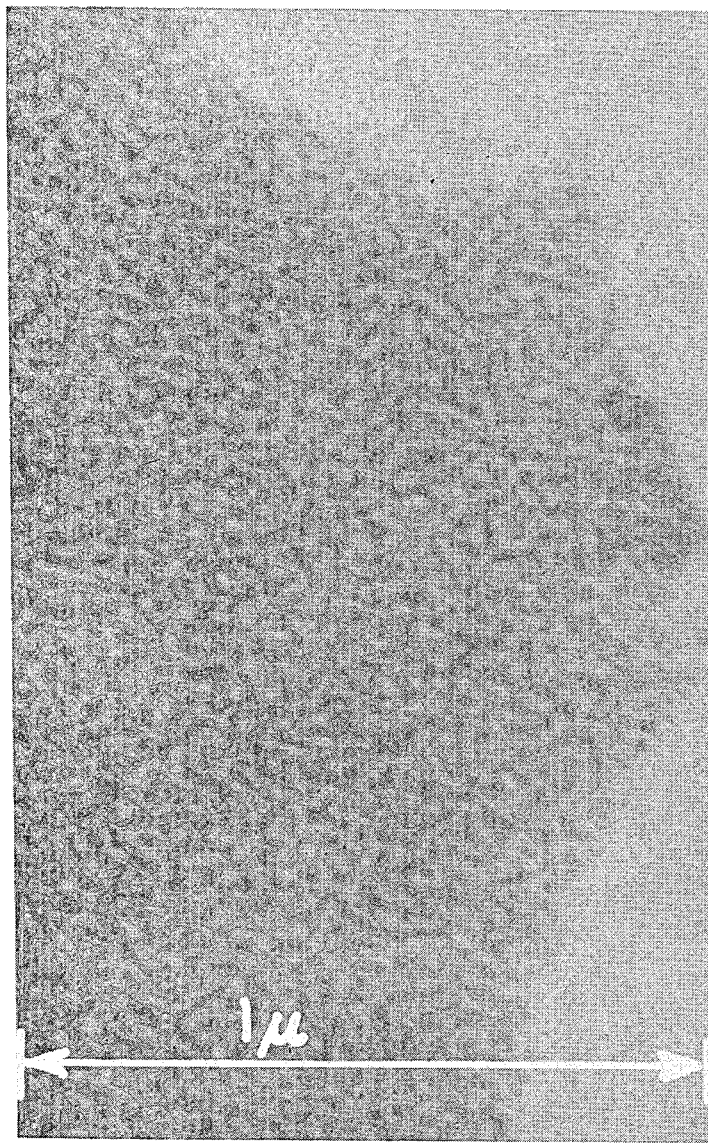
FIG. 6 is a micrograph of the surface of a porous glass article having interconnecting micropores.

FIG. 6 is an electron micrograph of 150,000X magnification showing the size and interconnecting nature of the micropores. The microporous glass shown here was produced from the composition and in the manner described in example I. The width of the micrograph represents one micron width of material. The dark portions in the micrograph are the pores which can be directly measured from the micrograph. The pores shown in FIG. 6 have an average diameter of about 70 angstroms.

The manufacture and testing of the best known modes contemplated for filter media of the present invention are described in the following examples.

EXAMPLE I

An alkali borosilicate glass composed in weight per cent of 5 percent $Na_2O$, 20 percent $B_2O_3$ and 75 percent $SiO_2$ is prepared by conventional sheet glass making techniques. The glass is heated at 1,110° F. for 2 hours to develop two separate glassy phases. The glass is then crushed into small particles and sieved to retain particles 300 to 400 microns in size. These particles are immersed for 1 hour in an acid bath comprising 3N hydrochloric acid at 98° C. This leaches out the more soluble glassy phase, leaving a porous glassy matrix. After the acid treatment, the porous glass matrix is washed with water to remove all traces of the soluble phase and any soluble impurities such as iron, which may have been acted on by the acid. This washing is done in running water for a period of 1 hour. The porous glass granules had pores ranging in size from 50 to 100 angstroms.

The leached porous glass has a chemical analysis of 96 percent $SiO_2$, 0.5 percent $Na_2O$ and 3.5 percent $B_2O_3$. The leached granules are then heat treated for 30 minutes at 500° C. in an atmosphere composed of 80 percent by volume water vapor and 20 percent by volume nitrogen. This treatment approximately doubles concentration of hydroxyl groups on the surfaces of the pores in the granules.

The granules as thus prepared are tested in various ways to determine their filtering effectiveness as compared with present commercial cigarette filters. The filters are tested in a smoking machine which exerts puffs of 2-second duration at intervals of 60 seconds with an average pressure drop of about 12 centimeters of water on each puff. Each test is carried out for a series of nine puffs.

A filter holder with a volume of 0.22 cubic centimeters is inserted in the smoking apparatus. The porous glass granules are tested in comparison with activated charcoal presently used in commercially available filter cigarettes. The filter holder contains about 0.16 grams of porous glass granules or 0.13 grams of granular-activated charcoal. The filter is made up of three segments as shown in FIG. 3 of the drawing with the intermediate section being the filter holder as just described and the outer sections both being of cellulose paper. Each section is about 20 millimeters in length.

The average of a greater number of tests of weight gain per test is shown below:

| Filter | Filter Weight Gains (Milligrams) |
| --- | --- |
| 1. Cellulose plus activated charcoal | 18.7 |
| 2. Cellulose plus porous glass | 20.6 |
| 3. Cellulose (all three sections) | 11.9 |

These tests show that the amount of material removed by the filter containing the porous glass granules is greater. However, the type of material is substantially different. Infrared spectra on the extract from the charcoal reveals chiefly humectant materials (added to keep tobacco moist), tars and some surface active material. The humectants are mainly glycols and esters and represent about 90 percent by weight of the extracted material, whereas the tars represent approximately 10 percent by weight of the material. Infrared spectra of the extract from the porous glass granules reveals a very complex mixture which is about 90 percent by weight aromatic and cyclic compounds and about 10 percent by weight humectant. Visually the charcoal extract is light brown and oily, whereas the porous glass extract is dark brown and highly viscous. The extract from the cellulose in all three filters is approximately 50 percent tars and 50 percent humectant materials and is dark and oily (only slightly viscous).

The above test was conducted on a Lark cigarette wherein porous glass and cellulose were substituted for charcoal in the three-part filter.

The highly volatile gases which pass through the filters in the above tests are collected in a cold trap and analyzed. The cellulose-porous glass gaseous test samples show lower amounts of HCN, $CH_4$, and disubstituted ring compounds than the cellulose gaseous test samples.

Taste tests and draw tests of the three types of filters do not show a significant difference in taste or draw from various commercially used cigarette tobacco.

EXAMPLE II

Lithia-Containing Porous Glass Materials

A lithia borosilicate glass of the following calculated composition was prepared:

| | |
| --- | --- |
| $Li_2O$ | 3 percent by weight |
| $B_2O_3$ | 20 percent by weight |
| $SiO_2$ | 77 percent by weight |

Lithium carbonate, boric acid, and silica were melted at about 1,450° C. Molten glass was cooled by quenching in a container of water. The glass experienced phase separation upon cooling and exhibited opalescence after it was cooled. The opalescence indicates that the borate phase is present in veins having a thickness of about 200 to 800 angstroms.

A second lithia-containing glass was prepared to provide a material of the following calculated composition:

| | |
| --- | --- |
| $Li_2O$ | 1 percent by weight |
| $Na_2O$ | 4 percent by weight |
| $B_2O_3$ | 20 percent by weight |
| $SiO_2$ | 75 percent by weight |

Lithium carbonate, sodium carbonate, boric acid, and silica were admixed and melted at about 1,450° C. The glass was cooled by quenching in a container of water, which also caused fritting of the glass; that is, small particles of the glass are obtained in this manner. Phase separation was accomplished by heat treating the glass at about 600° C. for 4 hours. The heat-treated material was transparent and exhibited only slight opalescence, indicating that the borate phase was present in very fine veins; that is, about 50 to 100 angstroms in diameter. C.

The glass was sieved and crushed to obtain a grain size of about 0.3 to about 0.7 millimeters. The fine particles were leached in three normal hydrochloric acid for 8 hours at 98° C. An electromicrograph of the porous material indicated pore size range of about 75 angstroms to about 150 angstroms.

When the above lithia porous glass materials are utilized as a tobacco smoke filter in a manner similar to that described in example I, results are achieved which are comparable to the soda borosilicate porous glass illustrated in example I.

Porous glasses wherein potassia is present are readily formed. Potassia borosilicate glasses phase separate and leach in the same manner as soda borosilicate glasses.

EXAMPLE III

Various Pore-Sized Material

A porous material was prepared by various heat treatments from a soda borosilicate glass having the following calculated composition:

| | |
| --- | --- |
| $Na_2O$ | 5 percent by weight |
| $B_2O_3$ | 20 percent by weight |
| $SiO_2$ | 75 percent by weight |

The glass was melted at 1,450° C. and fritted by quenching in water. The glass was crushed and sieved to obtain grain sizes of between 0.3 and 0.7 millimeters. The glass was divided into several portions which were heat treated for various periods of time to promote variations in phase separation. All the following glasses were leached in three normal hydrochloric acid for 8 hours at 98° C. and washed thoroughly. The pore size of the various glasses was determined by measuring the leached areas on an electron micrograph. This measurement has an accuracy of about ±25 percent, although the measurement gets more accurate as the pores get larger.

Glass 1a

This glass was heat treated for 1 hour at 630° C. The pore size was determined to be about 100 angstroms on the average.

Glass 1de

This material was heat treated for 3½ hours at 630° C. The pore size had an average diameter of 250 angstroms.

Glass 1e

This material was heat treated for 3 hours at 630° C. and had an average pore size of 250 angstroms.

Glass 1f

This glass was heat treated for 16 hours at 760° C. and had an average pore size of between about 750 and 1,000 angstroms.

Glass 1g

This glass was heat treated 3 hours at 675° C. and had an average pore size of about 500 angstroms.

The effectiveness of the above porous glasses having a range of pore sizes as cigarette or tobacco smoke filters was tested in the following manner:

Particulate Matter Filtration

The effectiveness of the above porous glasses as filters for particulate matter in tobacco smoke was tested by utilizing a Winston cigarette with a cellulose filter as received as a control. Test cigarettes were compared by utilizing a substituted filter of 20 millimeters length on the Winston cigarette with the following lengths of material: 5 millimeters of cellulose, 10 millimeters of porous glass, and 5 millimeters of cellulose as shown in FIG. 3. The size of the particulate matter removed ranged from 0.5 microns to 10 microns. Each cigarette was smoked until a butt length of 33 millimeters remained. The draw through the test filtered cigarettes was the same as the standard Winston filter cigarette. Generally, an average of 10 puffs on a standard smoke machine was required to produce a 35-millimeter puff at 2 seconds or rationed at the rate of about one puff per minute.

| Sample | Average Filter Disc Weight Gain (MGS) |
| --- | --- |
| Winston cigarette control | 21.0 |
| Glass 1de | 22.6 |
| Glass 1f | 22.8 |
| Glass 1g | 21.1 |

The average filter disc weight gain is the particulate matter collected on a Cambridge filter which filters out the particulate matter which passes through the cigarette filter. It is readily seen that the above filters are about as effective as the cellulose filter in removing particulate matter. The Glass 1g filter having a pore size of about 500 angstroms appears slightly more effective than the porous filters having bore sizes of 250 angstroms or in the 750 to 1,000 angstrom range.

Gas Filter Effectiveness

The above porous glasses were tested for their effectiveness in removing acetaldehyde and acetone. The test was conducted in a similar manner to that for the particulate filtration test with a Winston cigarette with a cellulose filter being utilized as a standard or control. The actual quantity of gas is not reported but the speak height of the gas chromatograph analysis is indicated, which is proportional to concentration.

| Sample | Acetaldehyde | Acetone |
| --- | --- | --- |
| Winston Cigarette with 20 mm. Standard Cellulose Filter | 46 | 14 |
| Winston Cigarette with 10 mm. Cellulose Filter and 10 mm. Glass 1a | 28 | 7 |
| Winston Cigarette with 10 mm. Cellulose and 10 mm. Porous Glass 1e | 21 | 6 |
| Winston Cigarette with 10 mm. Cellulose and 10 mm. Porous Glass 1g | 21 | 6 |
| Winston Cigarette with 10 mm. Cellulose and 10 mm. Porous Glass 1f | 35 | 8 |
| Winston Cigarette with no filter of any type | 51 | 18 |

From the above data it can be seen that the porous glass filters are considerably more effective in reducing the amount of harmful gases such as acetaldehyde and acetone passing through the filter than is the standard cellulose filter. The porous glasses having small pores (Glasses 1a, 1e, and 1g), that is, pores between about 100 angstroms and 500 angstroms appear more effective in removing gases such as acetaldehyde and acetone than does the glass having pores in the range of 750 to 1,000 angstroms (Glass 1f). However, even the material having larger pores is more effective in removing gases than a standard cellulose filter.

None of the porous glass materials described in this example had been treated with water vapor, i.e., the hydroxyl concentration on the surface of the glass had not been altered from that which naturally exists on such glasses after phase separation, leaching, and washing.

EXAMPLE IV

Porous glass material of the type described in example I having a pore size of about 50 to 100 angstroms was compared with commercial filter for effectiveness in removing particulate matter from tobacco smoke. The porous glass filters were of a structure of the type shown in FIG. 3 wherein a 20 millimeter filter length consisted of 10 millimeters of cellulose acetate and a chamber 10 millimeters long containing porous glass.

The cigarettes tested were conditioned for 24 hours at 75° F. and 60 percent relative humidity. Smoking was done in a room conditioned to 75°±2° F. and 60 ±2 percent relative humidity. The smoking system consisted of the cigarette, a tarred Cambridge filtered assembly, and a smoking machine that produces a 35-milliliter puff of 2-second duration at a rate of one puff per minute. All cigarettes were smoked to a butt length of 33 millimeters. Five cigarettes were smoked through each Cambridge filter and the results calculated and recorded in terms of one cigarette.

The table below reports total particulate matter, moisture in particulate matter, nicotine, and tar. The moisture present in particulate matter was determined according to a procedure described in a paper entitled "Determination of Moisture in Total Particulate Matter" by Schultz and Spears in *Tobacco Science*, Vol. X, pp. 75–76 (1966), this description being incorporated herein by reference. The nicotine content was determined by double distilling the particulate matter which had been washed with dry dioxaneisopropanol (100:1) and reading in the ultraviolet in a spectrophotometer. The tar content was that which remained after subtracting the quantity of moisture and nicotine from the total particulate matter collected in the Cambridge filter.

The effectiveness of these porous fibers as tobacco smoke filters was tested by preparing Winston cigarettes with a loosely packed porous fiber glass filter element 20 millimeters in length. These cigarettes were compared with a regular cellulose acetate filter and a nonporous fiber glass filter of fiber glass which had not been phase separated and leached. These

TABLE I

| Cigarette | Filter | Total particulate matter (mm.) | Moisture in particulate matter (mm.) | Nicotine (mm.) | Tar (mm.) |
|---|---|---|---|---|---|
| Winston | None | 41.2 | 5.4 | 1.78 | 34.0 |
| Do | Cellulose acetate | 30.5 | 3.9 | 1.47 | 25.2 |
| Do | Porous glass | 26.9 | 2.8 | 1.28 | 22.9 |
| Lark | None | 40.3 | 9.6 | 1.4 | 29.3 |
| Do | Activated charcoal | 21.1 | 4.5 | 0.9 | 15.8 |
| Do | Porous glass | 17.5 | 4.0 | 0.8 | 12.7 |
| Richmond | None | 31.0 | 8.2 | 1.3 | 21.5 |
| Do | Strickman filter (9.2 in. draw) | 9.5 | 2.8 | 0.5 | 6.3 |
| Do | Porous glass (6.3 in. draw) | 14.0 | 3.3 | 0.6 | 10.1 |

In the above tests, the resistance to airflow with the Winston cigarette with a commercial filter was about 4.1 inches of water while the Winston cigarette with the porous glass filter recorded 4.6 inches draw. The Lark cigarette with a commercial filter had a draw of about 5.3 inches while the Lark with a porous glass filter had a draw of about 5.0 inches. As indicated above, the Richmond filter had a draw of about 9.2 inches while the Richmond with a porous glass filter had a draw of about 6.3 inches. Although the Richmond commercial filter; that is, the Strickman filter, appears to be most efficient in removing particulate matter, it has the highest resistance to draw and this is a distinct disadvantage. Also, the Strickman material does not exhibit gas absorption properties comparable to activated charcoal or porous glass.

filters were also 20 millimeters in length. The following table shows the results:

TABLE II

| Cigarette | Filter | $\Delta P^1$, cm. of water | Average puffs | Particulate matter passed through$^2$, mg. |
|---|---|---|---|---|
| Winston | Cellulose acetate | 9.7 | 10 | 22.3 |
| Do | Porous fiber glass | 9.8 | 10 | 16.4 |
| Do | Regular fiber glass$^3$ | 9.7 | 10 | 17.3 |
| Do | No filter | 4.0 | 10 | 35-36 |

$^1$ The pressure drop shown is across the entire cigarette, including the filter.
$^2$ Average of 10 cigarettes for each type of filter.
$^3$ Regular, non-porous fiber glass of the same composition without phase separation and leaching has a surface area of about 6 m.$^2$/gm.

The porous fiber glass proved to be significantly more effective in removing tars and nicotine than the commercial grade cellulose acetate filter and was the nonporous fiber glass (nonporous) filter. Regular nonporous fiber glass has a nitrogen surface area of about 6 square meters per gram while the porous fiber glass utilized in this example had a nitrogen surface area of about 137 square meters per gram.

Fiber glass of potassia borosilicate performs in a manner to the soda borosilicate compositions described in this example.

Nitrogen surface areas of the microporous glass utilized in this invention were determined according to standard techniques. Such techniques are described by S. Brunauer in *The Absorption of Gases and Vapors*, Vol. I, p. 271, Oxford University Press, London (1945).

EXAMPLE V

Porous Fiber Glass Filter

Fibers were prepared having the following calculated composition:

| Oxide | Weight Percent |
|---|---|
| Na$_2$O | 5 |
| B$_2$O$_3$ | 20 |
| SiO$_2$ | 75 |

Raw materials for this glass were melted and fritted. The fritted glass was then remelted at about 2,800° F. in a small crucible above a bushing having an orifice of about 6 microns diameter. The glass was held at about 2,800° F. for about 1 hour before fibers were drawn. Fiber-drawing conditions were a drawing speed of 5,000 feet per minute at a bushing temperature of 2,350° F. during one run and a speed of 5,500 feet per minute at 2,410° F. bushing temperature during another run. The fibers produced by both runs were substantially identical, having a diameter of about 6 microns.

The fibers were cut into lengths of about 6 to 9 inches and spread out into a mat for heat treating. Heat treating was conducted at 575° C. for 5 hours to bring about phase separation. The fibers were then cooled to room temperature and leached in three normal hydrochloric acid at 98° C. for about 1½ hours. The fibers were then thoroughly washed with water.

The resulting fibers had interconnecting pores of about 75 angstroms in diameter, as determined from electron micrographs, and a chemical composition of about 95 percent by weight SiO$_2$, 5 percent by weight B$_2$O$_3$, and 0.1 percent by weight Na$_2$O. The pore volume was between 20 and 25 percent. The surface area of the porous fibers was about 137 square meters per gram as determined by nitrogen absorption according to the method described by Emmett, Brunauer, and Teller in *Journal of the American Chemical Society*, 56, 35 (1934) and 57, 1954 (1935).

Methods for determining the quantitative presence of hydroxyl groups on glass surfaces, especially porous glass surfaces, have been described by M. J. D. Low and N. Ramasubramanian, "Infrared Study of the Nature of Hydroxyl Groups on the Surface of Porous Glass," *Journal of Physical Chemistry*, Vol. 70, No. 9, pp. 2740-2746, Sept., 1966. The presence of hydroxyl groups on porous glass utilized in this invention was determined according to the techniques described by Low and Ramasurbramanian.

Techniques for determining components in cigarette smoke have been described by R. J. Phillippe, H. Moore, R. G. Honeycutt, and J. M. Ruth, "Some Hydrocarbons of the Gas Phase of Cigarette Smoke," *Analytical Chemistry*, Vol. 36, No. 4, pp. 859-865, Apr. 1964, and by R. J. Phillippe and M. E. Hobbs, "Some Components of the Gas Phase of Cigarette Smoke," *Analytical Chemistry*, Vol. 28, No. 12, pp. 2002-2006, Dec., 1956.

Pore size reported hereinabove was determined by photographing surface of the microporous glass through an electron microscope, physically measuring the pores on the photograph, and then dividing the measurement by the magnification of the microscope.

EXAMPLE VI

Porous fiber glass filters of the type described in example V were tested in a Winston cigarette for effectiveness in reducing acetaldehyde and acetone gases present in tobacco smoke. The actual quantity of gas present is not reported, but the peak height of the gas chromatograph analysis is indicated which is proportional to concentration.

| Sample | Acetaldehyde | Acetone |
| --- | --- | --- |
| Winston Cigarette with 20 mm. Standard Cellulose Filter | 78 | 20 |
| Winston Cigarette with 20 mm. Porous Fiber Glass Filter | 66 | 12 |

The porous fiber glass filter removed about 15 percent more acetaldehyde and about 40 percent more acetone than the cellulose acetate filter.

In vivo pulmonary dynamics and mucus flow bioassay, studies also illustrated the greater effectiveness of porous glass filters of this invention over cellulose acetate filters in eliminating harmful ingredients present in tobacco smoke.

Pulmonary function determined by the method of Mead, J., *Journal of Applied Physiology*, 15, 325 (1960), as modified by Murphy, S. D., and Ulrich, C. E., *American Ind. Hygiene Assoc., J.*, 25, 28 (1964) showed greater reduction of respiratory, tidal volume and minute volume when guinea pigs were exposed to smoke from a regular filter (cellulose acetate) Winston cigarette than when exposed to smoke from a Winston cigarette having a porous glass filter of the type described in example III. One such porous glass filter had pores of about 250 angstroms in diameter while another had pores of about 900 angstroms in diameter. Both were more effective in the pulmonary dynamics studies than the cellulose acetate filters although resistance to draw and taste were comparable.

In mucus flow studies on young cats by the method of Goldhamer, R. E., Barnett, B., and Carson, S., *Federation Proc.*, 23, 406 (1964) the porous glass filters of the type described in example III proved considerably more effective than regular filters (cellulose acetate) when tested on Winston cigarettes. The least deviation from normal mucus flow is considered as least harmful to the specimen. The deviation from normal mucus flow was as follows:

| Filter | Deviation |
| --- | --- |
| Regular filter Winston | 58% |
| Porous glass filter Winston (Pores of about 900°A) | 37% |
| Porous glass filter Winston (Pores of about 250°A) | 35% |

The porous glass tobacco smoke filters of this invention proved extremely effective in removing tars, nicotine, and harmful gases from tobacco smoke. That this evidence was significant was demonstrated by pulmonary and mucus flow studies on live specimens.

While specific examples have been set forth hereinabove to illustrate the invention, the invention is not to be considered limited thereto, but to include all the variations and modifications falling within the scope of the appended claims.

What we claim is:

1. A smoking device comprising a front section designed to accommodate a tobacco charge and smoke conduit downstream therefrom in which is disposed a charge of microporous glass particles selected from the group consisting of glass fibers, glass granules, and glass fiber-cellulose fiber mixtures, each of said glass particles being a microporous skeletal structure in which the $SiO_2$ content is at least about 90 percent by weight.

2. The smoking device of claim 1, wherein the microporous glass has a pore volume of 5 to 70 percent of an average pore size of 5–10,000 angstroms in diameter.

3. The smoking device of claim 1 wherein the microporous glass has an average pore size 40 to about 1,000 angstroms in diameter.

4. The smoking device of claim 1 wherein said microporous glass particles are composed of a leached, phase-separated alkali borosilicate glass.